United States Patent [19]

Yasuda

[11] Patent Number: 5,311,559
[45] Date of Patent: May 10, 1994

[54] APPARATUS FOR CORRECTING WAVEFORM DISTORTION

[75] Inventor: Nobuyuki Yasuda, Chiba, Japan
[73] Assignee: Sony Corporation, Tokyo, Japan
[21] Appl. No.: 940,102
[22] Filed: Sep. 3, 1992

[30] Foreign Application Priority Data

Sep. 3, 1991 [JP] Japan .................. 3-250488

[51] Int. Cl.⁵ .............................. H04L 7/06
[52] U.S. Cl. ........................ 375/113; 375/87; 328/162
[58] Field of Search ............ 375/55, 87, 94, 95, 375/113; 341/70; 328/152, 155, 162

[56] References Cited

U.S. PATENT DOCUMENTS

| | | | |
|---|---|---|---|
| 4,242,755 | 12/1980 | Gavzan | 375/87 |
| 4,567,604 | 1/1986 | Jacksier | 375/87 |
| 4,992,790 | 2/1991 | Montgomery | 371/70 |
| 5,127,023 | 6/1992 | Tash et al. | 341/70 |

*Primary Examiner*—Stephen Chin
*Attorney, Agent, or Firm*—Robert P. Biddle; Jerry A. Miller

[57] ABSTRACT

An apparatus for correcting wave distortion. An input signal is supplied to a delay circuit, the input signal being so modulated that an accumulated value of a time interval from its leading edge to its trailing edge equals another accumulated value of another time interval from a trailing edge to a leading edge. The delay circuit generates plural successively delayed outputs, each of which has a certain time delay shorter than the time interval. A selector selects a plurality of delayed signals among the plural delayed outputs. A synthesizer synthesizes a plurality of delayed signals so that a synthesized signal can be obtained by correcting at least one of the time interval and the another time interval through the certain time delay. A detector detects a difference between a time interval from a leading edge to a trailing edge and another time interval from a trailing edge to a leading edge of the synthesized signal out of the synthesizer. A generator generates a control signal which controls, based on a detected output by the detector, the selecting operation and the synthesizing operation so as to accumulate a value of a time interval from a leading edge to a trailing edge of the synthesized signal equal to another accumulated value of another time interval from a trailing edge to a leading edge of the synthesized signal.

8 Claims, 8 Drawing Sheets

BIT CLOCK PERIOD

|     | CHANNEL CODING | |
| --- | --- | --- |
|     | WHEN PREVIOUS SYMBOL IS "0" | WHEN PREVIOUS SYMBOL IS "1" |
| "B" | 1 1 1 0 1 0 0 0 | 0 0 0 1 0 1 1 1 |
| "M" | 1 1 1 0 0 0 1 0 | 0 0 0 1 1 1 0 1 |
| "W" | 1 1 1 0 0 1 0 0 | 0 0 0 1 1 0 1 1 |

APPARATUS FOR CORRECTING WAVEFORM DISTORTION

BACKGROUND

1. Field of the Invention

The present invention relates to an apparatus for correcting waveform distortion. In particular, the invention relates to an apparatus for correcting time distortion in a received signal which is modulated (for example by Bi-Phase-Mark modulation) and thereafter transmitted.

2. Background of the Invention

The Electronic Industries Association of Japan, EIAJ CP-340, has published an interface for Serial Data Transmission and Self Synchronizing Transmission for mutual communication among digital audio equipment. In the format for this digital audio interface, the method of Bi-Phase-Mark is an adopted channel coding method for modulation.

The coding under this Bi-Phase-Modulation is shown in FIG. 5. Clock pulses for modulation (at two times the bit rate) are illustrated in FIG. 5A. Source data represented by Non Return Zero (NRZ) coding are illustrated in FIG. 5B. The source data modulated by the B-Phase-Mark coding is illustrated in FIG. 5C.

When we define one interval of the modulation clock as T (which equals one half of a bit clock period), the Bi-Phase-Mark coding is a modulation method in which '1' and '0,' of the source data are respectively represented by a signal with an interval (1T) of inversion time from "1" to "0" and another interval (2T) of inversion time from "1" to "0" as illustrated in FIG. 5. As shown in FIG. 5C, a '1' in the source data is represented by a signal which turns from "1" to "0" with an inversion time (the time between state inversions) being equal to an interval (1T) and '0' in the source data is represented by another signal which turns from "1" to "0" with an inversion time of (2T).

This Bi-Phase-Mark method is a method of modulation in which an accumulated value of time interval represented by a signal "1" becomes equal to another accumulated value of time interval represented by another signal "0". Therefore, the Direct Current (DC) component in the transmitting line can be minimized. In addition, it is a method of modulation in which clock can be easily retrieved from the transmitted data signals.

The signal format of this standard for a digital audio interface is shown in FIG. 7. In this example, the digital audio data are divided into two stereo channels, and blocks of 192 frames from a frame #0 to #191. Each frame includes two subframes. In this two channel case, a channel #1 (for example as a left channel) is assigned as a subframe at the first half of one frame and a channel #2 (for example as a right channel) is assigned as a subframe at the second half of the frame. A subframe includes 32 bits (which corresponds to 64 modulation clocks). A four bit preamble of added data is inserted at a header of each subframe. This preamble can be utilized for synchronizing and identifying a subframe and a block. A special pattern is adopted as this preamble which does not appear in the previously mentioned data of Bi-Phase-Mark codings.

To distinguish a subframe at the first half of a frame from another at the second half, each preamble is different with respect to each other. Also, a special preamble of the first subframe at the beginning of a block is adopted to distinguish it from those for other subframes.

Therefore, three different kind of synchronizing patterns, referred to as B, M and W, are provided. A typical example of these three patterns for the preamble B, M or W is illustrated in FIG. 6. As shown, two different patterns are prepared for each preamble B, M or W so that one of them can be selected depending on whether the previous symbol data as the Bi-Phase-Mark coding is "0" or "1". The polarity of signal is the only difference between these two patterns, therefore, they are basically the same signal.

As shown in FIG. 7, the preamble B is inserted at a header portion of the first subframe at the beginning of a block so that the block can be identified and synchronized. The preamble M is inserted at every header of subframes at the first half of each frame, except for the first subframe at the beginning of a block. The preamble W is inserted at every header of subframes at the second half of each frame. These preambles M and W can be utilized for identifying and synchronizing subframes. As understood by FIG. 6, considering a time interval needed for polarity conversion in these preambles B, M and W, the time interval for the first polarity of three of them is 3T, which doesn't appear as any of the Bi-Phase-Mark data.

In a conventional operation of receiving signals modulated by the above mentioned Bi-Phase-Mark, a modulated clock component and a word synchronizing component of data (3T component of preamble) is retrieved from the receiving modulated signal. Using these components as references with a Phase Lock Looped (PLL) circuit, modulation clocks and bit clocks can be generated for data. By these clock, extraction of modulated signals and demodulation of data can be performed.

FIG. 8 shows a block diagram as a example of the conventional data receiving circuit. A modulated signal under the Bi-Phase-Mark from a transmitter 1, is transmitted through a transmission line such as an optical cable 2 and then received by a receiver 3. The process of passing through the transmission line smoothes the waveform of the received data at the receiver 3 to approximate a sine wave. Therefore, the wave should be shaped to a square wave. One of the method of this wave shaping is performed by considering a DC level of the retrieved signal as a threshold value and comparing this threshold value of the received data.

The output signal from the receiver 3 is supplied to a clock component extractor 6 where the clock component can be extracted from the signal. The extracted clock component is then supplied to a Phase Lock Looped (PLL) circuit 10. The PLL circuit 10 includes a Voltage Controlled Oscillator (VCO) 11. An output from the VCO 11 is supplied to a counter circuit 12 working as a variable frequency divider. Plural signals with different frequencies can be obtained as output of the counter circuit 12. Among them, a signal having the frequency corresponding to the modulated clock is provided back to the phase comparator 13 to be compared with the clock component derived from the clock component extractor 6. An error output by the comparison output of the phase comparator 13, which represents a phase difference, is then supplied to the VCO 11 through a Low Pass Filter (LPF) 14. The oscillating output signal of this VCO 11 is therefore controlled so as to synchronize with the output signal of the cock component extractor 6. As the result, signals with different frequencies but synchronized with the clock component of the received signal can be obtained out of the counter 12. The signal out of the receiver 3 is also supplied to a signal extractor 4. The signal extractor 4 extracts signals "1" and "0" at timings synchronized with a clock received from the counter circuit 12 of the PLL circuit. An output signal from the signal extractor 4 is supplied to a decoder 5. The decoder 5 makes the Bi-Phase-Mark codings demodulated to the original NRZ data, based on a clock for decoding received also from the counter circuit 12.

As the DC level of the Bi-Phase Mark codings approaches zero, a threshold value for wave shaping at the receiver 3 is also set to zero. However, the output of receiver 3 sometimes includes time distortion. For example, once a DC offset occurs at a transmitting line or a receiving element, or the threshold value includes DC offset, the relative levels between the threshold value and the received signal vary. Therefore, the interval of signal to be "1" or "0" cannot be properly modulated. When this occurs, distortion may be generated.

As shown in FIG. 9A, when a threshold value is kept at th1, the time interval (time period needed for polarity inversion) of signals "1" or "0" can properly appear as show in FIG. 9B. However, if the threshold value deviates to th2, the interval of signals "1" and "0" may include time distortion as shown in FIG. 9C. If we still use the bit clock out of the PLL circuit 10 in FIG. 8 to extract signals "1" and "0" at the signal extractor 4 and the above mentioned time distortion, the timing between the clock and the signals of "1" and "0" would become different from each other. The erroneous extraction of signal can occur as mentioned above. To avoid this erroneous operation, it is better to remove the time distortion from the signal from the receiver 3 and then provide the signal extractor 4 with a received output signal. For that purpose, a method has been developed in which the square wave obtained through a wave shaping is converted to a triangle wave. The triangle wave is then supplied to a low pass filter so as to detect its DC level by which the threshold value of wave shaping may be controlled. However, in this method, since this is an analog control, adjustment is troublesome and signal to noise (S/N) ratio becomes worse resulting in a limited correction. Furthermore, as the whole signal out of the receiver may vary, the phase of the synchronizing pattern in the preamble may also deviate, further degrading the correction.

SUMMARY OF THE INVENTION

It is an object of the present invention to provide an apparatus for correcting waveform distortion which can resolve the above-mentioned problems.

It is another object of the present invention to provide an apparatus for correcting waveform distortion which is based upon digital circuits.

In one aspect of the present invention, an input signal is so modulated that an accumulated value of a time interval from a leading edge to a trailing edge (in a condition that the signal is in its "1") equals to another accumulated value of another time interval from a trailing edge to a leading edge (in another condition that the signal is in its "0") is supplied to a delay circuit of an apparatus of this invention. The delay circuit creates plural delayed outputs, each of which has a certain time delay shorter than the time interval. Among the plural delayed outputs, a plurality of delayed signals are selected by a selecting circuit. The plurality of delayed signals are so synthesized by a synthesizer that a synthesized signal can be obtained by making the time interval (where the signal is its "1") and/or the another time interval (where the signal is its "0") corrected through the certain time delay. The apparatus also includes a detector to detect a difference between the time interval and the another time interval of the synthesized signal derived from the synthesizer. A control signal is generated by control circuits based on the detected output from the detector to control the selecting and synthesizing operation performed at the selector and synthesizer. They are controlled so as to make an accumulated value of the time interval equal to another accumulated value of the another time interval of the correcting signal.

In accordance with the present invention, plural delayed signals are prepared and selected to synthesize for the purpose of making an accumulated value of a time interval for "1" state of the signal equal to another accumulated value of another time interval for "0" state. As the result, a properly corrected signal can be obtained as a correcting signal in which time intervals for "1" and "0" are respectively corrected. The waveform distortion can be corrected by synthesizing a plurality of delayed signals which are respectively delayed for a certain delay time through the delay circuit. It is therefore precisely corrected in digital within the certain delayed time. The reading out of signals "1" and "0" can be precisely performed. Compared with the conventional method with analog circuit arrangements, there is no need to make troublesome adjustment according to this invention, it is also advantageous with respect to signal to noise (S/N) ratio.

BRIEF DESCRIPTION OF THE DRAWING

The present invention will be more readily understood with reference to the accompanying drawing, wherein.

DESCRIPTION OF THE INVENTION

An apparatus for correcting waveform distortion as embodiments of this invention will be described in detail with the drawings as they apply to the received signals of digital audio data which is modulated and transmitted by the above mentioned Bi-Phase-Mark modulation.

Figure 1:
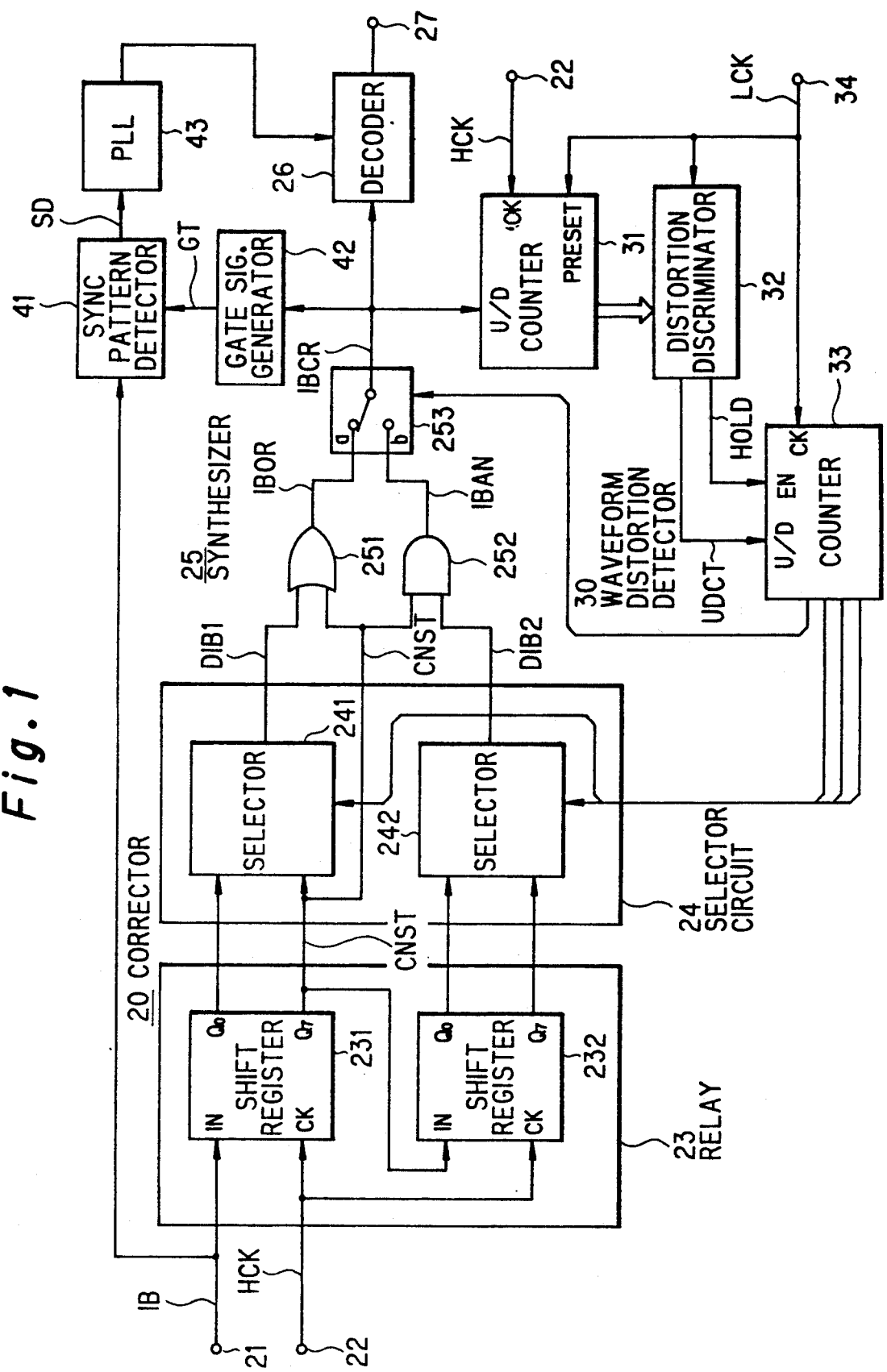
FIG. 1 shows a block diagram of an embodiment of the present invention.

Referring to FIG. 1, Bi-Phase-Mark coding data IB is received through an input terminal 21 and supplied to a waveform distortion corrector 20. The corrector 20 includes a delay circuit 23, a selector 24 and a synthesizer 25. The input data IB is supplied to the delay circuit 23. The delay circuit 23, in this embodiment, includes two shift registers 231 and 232. The Bi-Phase-Mark coding data IB is supplied to an input of the shift register 231, and an output Q7 of the register is connected to an input of the another register 232. The registers 231 and 232 are driven by a high frequency clock HCK (as shown in FIGS. 2B and 3B), derived from another input terminal 22 to a clock input of the registers 231 and 232.

Figure 2:
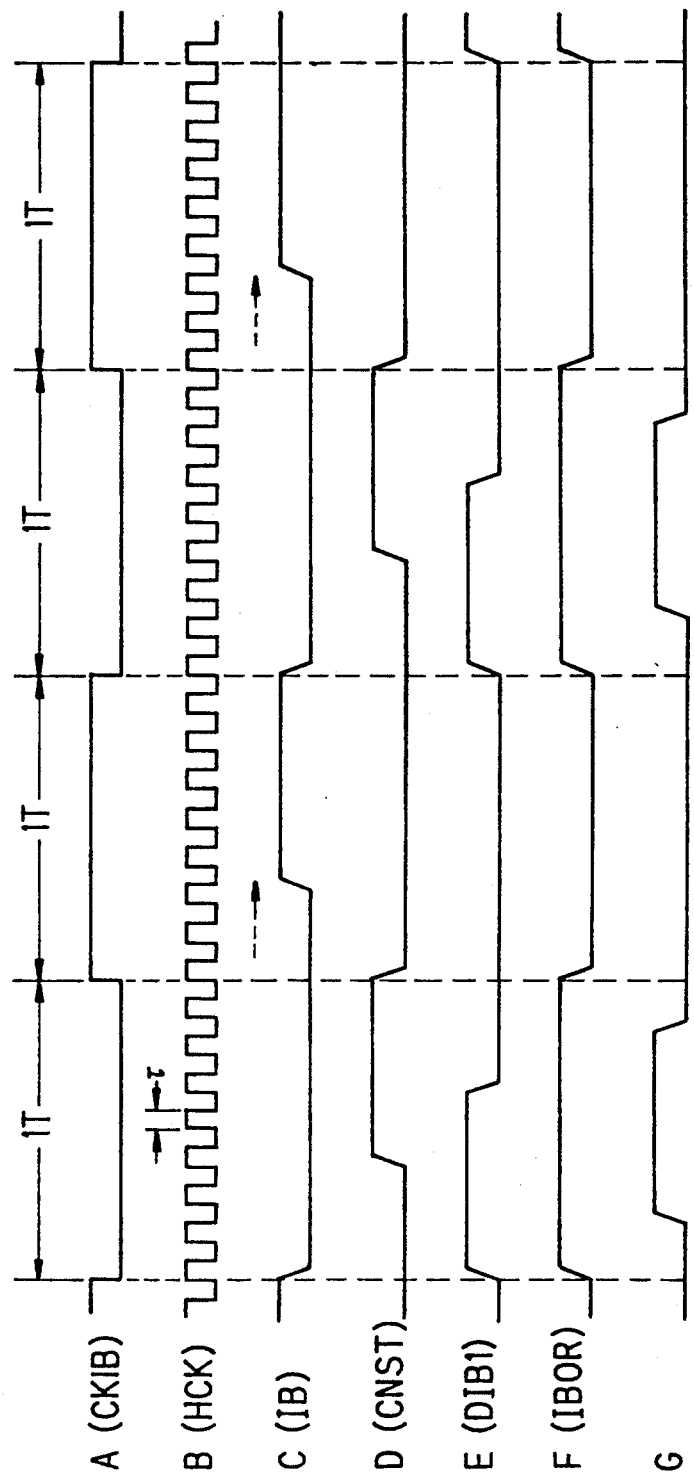
FIG. 2 shows a timing chart with waveforms in the embodiment shown in FIG. 1, when a time interval of a received signal representing "0" is longer than that of the signal representing "1"
Figure 3:
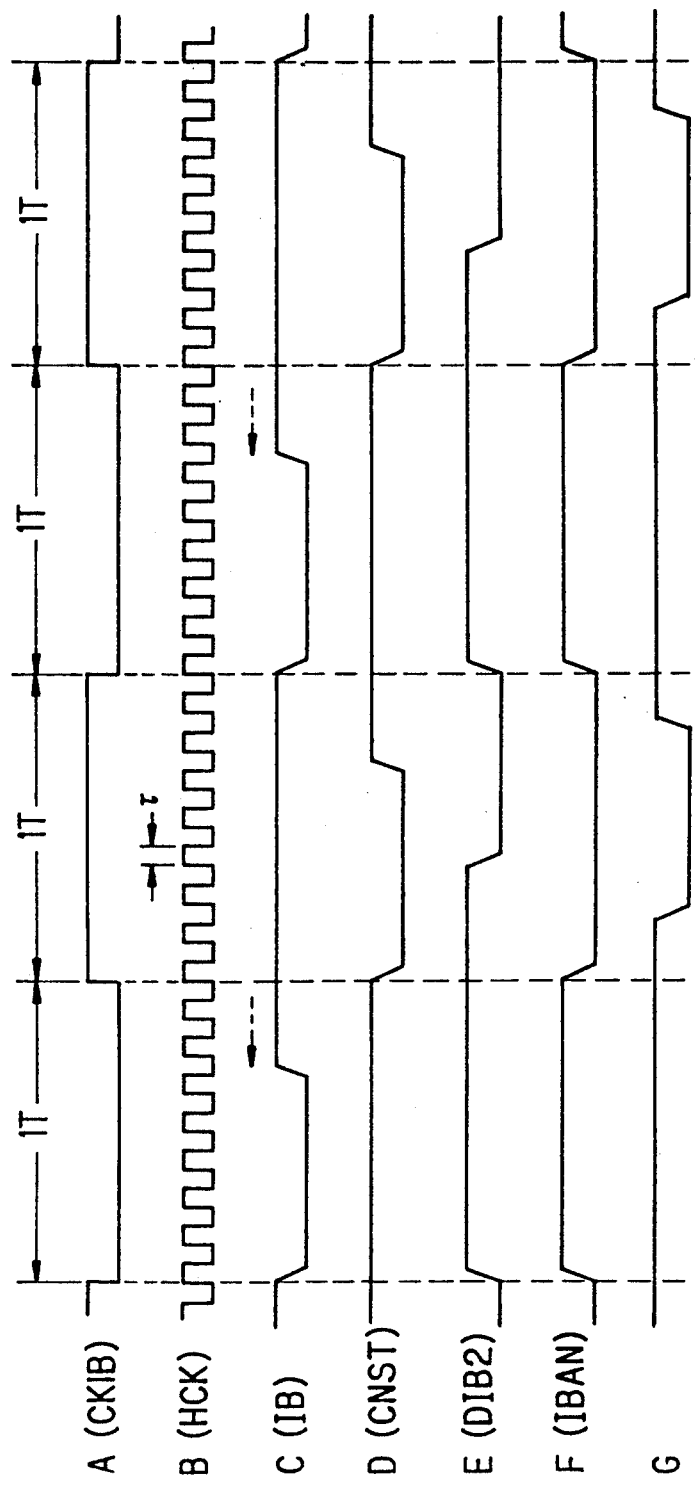
FIG. 3 shows another timing chart with waveforms in the embodiment shown in FIG. 1, wherein a time interval of a received signal representing "1" is longer than that of the signal representing "0"

As shown in FIGS. 2 and 3, the clock HCK in this embodiment has a period t which is one sixteenth (1/16) of that of bit clock CKIB (the time needed for a complete cycle of the clock HCK equals T/8). The outputs Q0 through Q7 of shift register 231 are delayed signals with each signal being delayed by delay t over the previous output (e.g., Q6 is Q5 delayed by delay t). In other words, the output Q7 of shift register 231 becomes a signal CNST which has a delay corresponding to just 1T from the input data IB as shown in FIGS. 2D and 3D. The outputs Q0 through Q7 of shift register 232 become signals having a delay of 1T plus a successive delay of t for each successive output Q0 through Q7. Plural signals out of the delay circuit 32 are supplied to a selector circuit 24. Selector 24 includes two selectors 241 and 242. Selector 241 receives the outputs Q0 through Q7 of shift register 231, and another selector 242 receives the outputs Q0 through Q7 of shift register 232. The selector 241 selects one of the outputs Q0 through Q7 of shift register 231 depending on a selection control signal, which will be described later. The selector 242 similarly selects one of the outputs Q0 through Q7 of shift register 232. As its three outputs, the selector circuit 24 provides an output signal DIB1 from the selector 241, another output signal DIB2 from the selector 242 and a further output signal CNST from the output Q7 of shift register 231.

These outputs of the selector circuit 24 are supplied to a synthesizer 25. The synthesizer 25, in this embodiment, comprises an OR gate 251, an AND gate 252 and a switching circuit 253. The outputs DIB1 and CNST of the selector 241 are supplied to the OR gate 251. The OR gate 251 generates a correcting signal IBOR in which a time interval of the input data "1" is corrected to make it longer when the time interval of the signal is too short. On the other hand, the output DIB2 of the selector 242 and a signal CNST are supplied to the AND gate 252. The AND gate 252 generates another correcting signal IBAN in which a time interval of the input signal "1" is corrected to make it shorter when it becomes long. The switching circuit 253 determines which of the output IBOR of OR gate 251 or the output IBAN of OR gate 252 is appropriate as the synthesized output IBCR depending on a control signal (which will be discussed later) for switching.

The synthesized output IBCR from the switching circuit 253 is then supplied to a waveform distortion detector 30. This detector 30 includes an up-down counter 31, a distortion discriminator 32 and another up-down counter 33. The synthesized output IBCR is now supplied as up-down control signal for the up-down counter 31. In this embodiment, the clock HACK ia supplied also to a clock terminal of this up-down counter 31. The counter 31 counts the clock HACK upwards when the output IBCR is in its "1" state, and counts the clock HACK downwards when the output IBCR is in its "0" state.

This counter 31 has been previously set (or reset) by a low frequency clock LCK from an input terminal 34. The clock LCK is, for example, a clock with a period which equals to that of bit clock CRIB multiplied by an integer number. Therefore, the up-down counter 31 counts the clock HACK upwards or downwards from this previously set value. In other words, immediately before the next set (or reset), the counted value of counter 31 is a value corresponding to a difference between the total up-counts and down-counts. The difference becomes apparent as a deviated value from the previously set (or reset) value. The difference also means a difference between the accumulated value of time intervals representing "1" and the accumulated value of time intervals representing "0" of the output IBCR within a single cycle of the low frequency clock LCK.

Since the Bi-Phase-Mark codings are modulated so as to make the accumulated value of time intervals for the signal in its "1" state equal to the accumulated value of time intervals for the signal in its "0" state, the counted value of the counter 31 must be the previously set (or reset) value when no time distortion occurs. However, if the counted value deviates from the previously set (or reset) value, time distortion occurs in the output IBCR in accordance with the deviation.

Just before the clock LCK sets (or resets) the counted value of the counter 33, the value is transferred to a distortion discriminator 32. The distortion discriminator 32 detects whether the difference between the counted value of counter 31 and the preset value is larger than the minimum unit correction at the waveform corrector 20. The detected output HOLD is supplied to an enable terminal of an up-down counter 33. Upon receiving the output HOLD, the up-down counter 33 stops counting and holds its counted value when the difference between the counted value of counter 31 and its pre-set value is smaller than the minimum unit correction of the waveform corrector 20. Depending on whether the counted value of counter 31 is larger or smaller than its pre-set value, the distortion discriminator 32 can detect the direction of distortion to know whether the time interval representing "1" is longer or "0" is longer at the output IBCR. The detected output UDCT is supplied to an up-down terminal of the counter 33. The low frequency clock LCK is supplied to a clock terminal of the up-down counter 33. The up-down counter 33, therefore, counts upwards or downwards in accordance with a state of the output UDCT when the difference between the counted value of counter 31 and its pre-set value is larger than the minimum unit correction at the waveform corrector. A part of the output as a counted value of the up-down counter 33 is supplied to a selector 24 as a control signal for selection, and other part of the output as a counted value is supplied to a switching circuit 253 as a control signal for changing over. By this control feedback loop, the time interval for "1" and "0" of the synthesized output IBCR can be corrected so as to make the accumulated value of time interval for "1" equal to the same for "0" in the output IBCR out of the switching circuit 253.

When the time interval of "0" is long and the interval of "1" is short in the input Bi-Phase-Mark coding data I as shown for example in FIG. 2C, the switching circuit 253 can be controlled to connect to a terminal (a) and to be in a state obtaining an output IBOR out of the OR circuit 251. The output CNST (see, FIG. 2D) with 1T delay from the input data I and the selected output DIB1 (see, FIG. 2E) out of the selector 241 with a delay corresponding to an amount of distortion are supplied to the OR gate 251. The OR gate 251, therefore, generates a logic sum output IBOR (see, FIG. 2F) which is corrected, in response to an amount of distortion, to make the interval of "1" longer and that of "0" shorter. During this correcting operation, as the counted value of the counter 33 becomes longer (the input has a distortion which makes the interval of "0" longer), the selector 241 selects its output DIB1 having a bigger offset in phase from the output CNST.

If the waveform distortion becomes large and the interval of "1" results in less than a half ($\frac{1}{2}$) of the minimum interval 1T, the mere logical sum of the two signals CNST and DIB1 does not become "1" between these signals. In such a case, a signal with a medium delay (an additional selector may be required to select this signal) as shown in FIG. 2G should be supplied to the OR gate 251.

When the time interval of "1" is long and the interval of "0" is short in the input Bi-Phase-Mark coding data IB as shown for example in FIG. 3C, the switching circuit 253 can be controlled to connect to a terminal (b) and to be in a state obtaining an output IBAN out of the AND circuit 252. The output CNST (see, FIG. 3D) with 1T delay from the input data I and the selected output DIB2 (see, FIG. 3E) out of the selector 242 with a delay corresponding to an amount of distortion are supplied to the AND gate 252. The AND gate 252, therefore, generates a logic multiply output IBAN (see, FIG. 3F) which is corrected, in response to an amount of distortion, to make the interval of "0" longer and that of "1" shorter. During this correcting operation, as the counted value of the counter 33 becomes longer (the input has a distortion which makes the interval of "0" longer), the selector 241 selects its output DIB2 having a bigger offset in phase from the output CNST.

If the waveform distortion becomes large and the interval of "0" results in less than a half ($\frac{1}{2}$) of the minimum interval 1T, the mere logical multiply of the two signals CNST and DIB2 does not become "0" between these signals. In such a case, a signal with a medium delay (an additional selector may be required to select this signal) as shown in FIG. 3G should be supplied to the AND gate 52.

As described above, the output IBCR is obtained out of the switching circuit 253 with having the waveform distortion corrected. This output IBCR is then supplied to a decoder 26 where the demodulation process from the Bi-Phase-Mark can be performed by a clock provided out of the PLL for decoding. The demodulated output data is derived from an output terminal 27.

Figure 4:
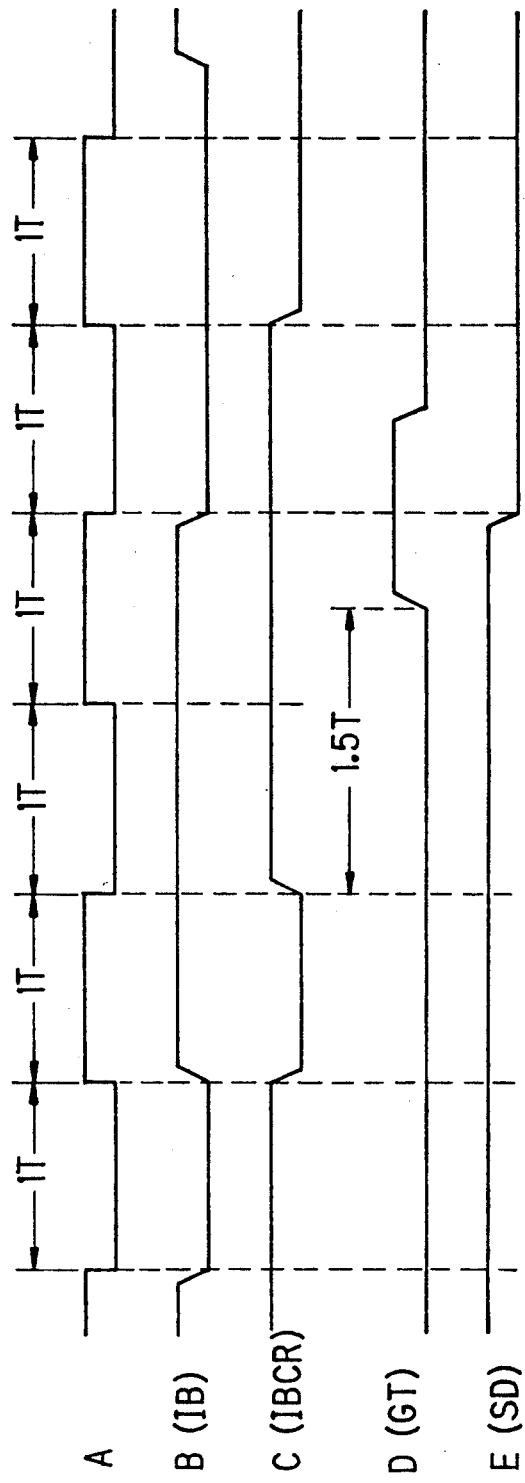
FIG. 4 shows a timing chart illustrating the detecting operation of the synchronizing pattern in the embodiment shown in FIG. 1.
Figures 5, 6:
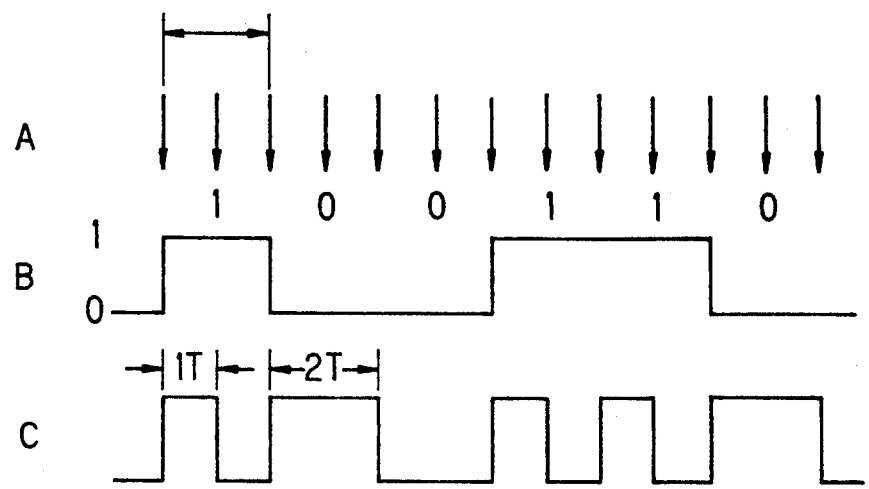
FIG. 5 shows the theory of Bi-Phase-Mark codings.
FIG. 6 shows patterns of the preambles used in transmitting a signal.
Figure 7:
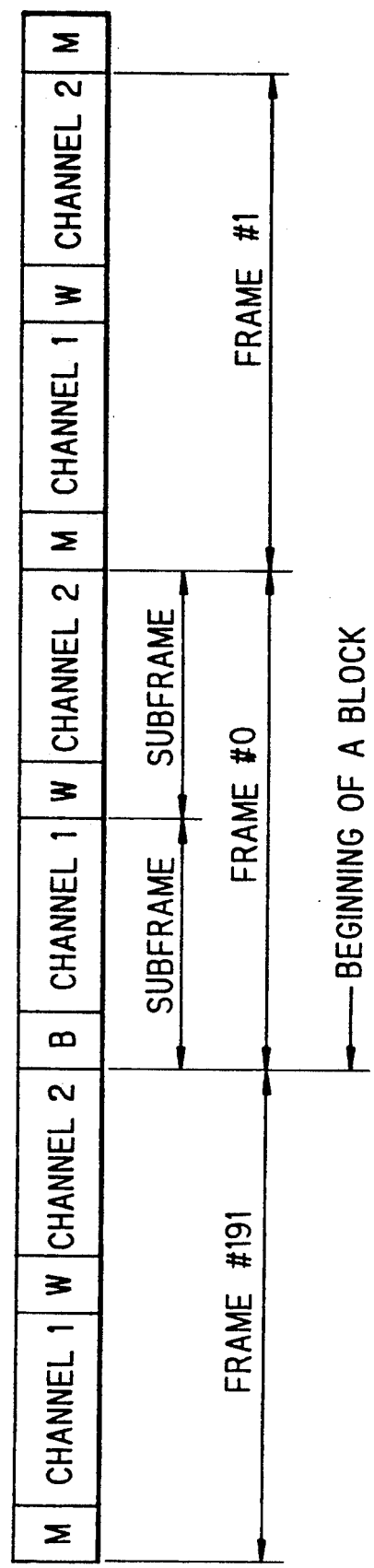
FIG. 7 shows a signal format as an example of a digital audio interface.
Figure 8:
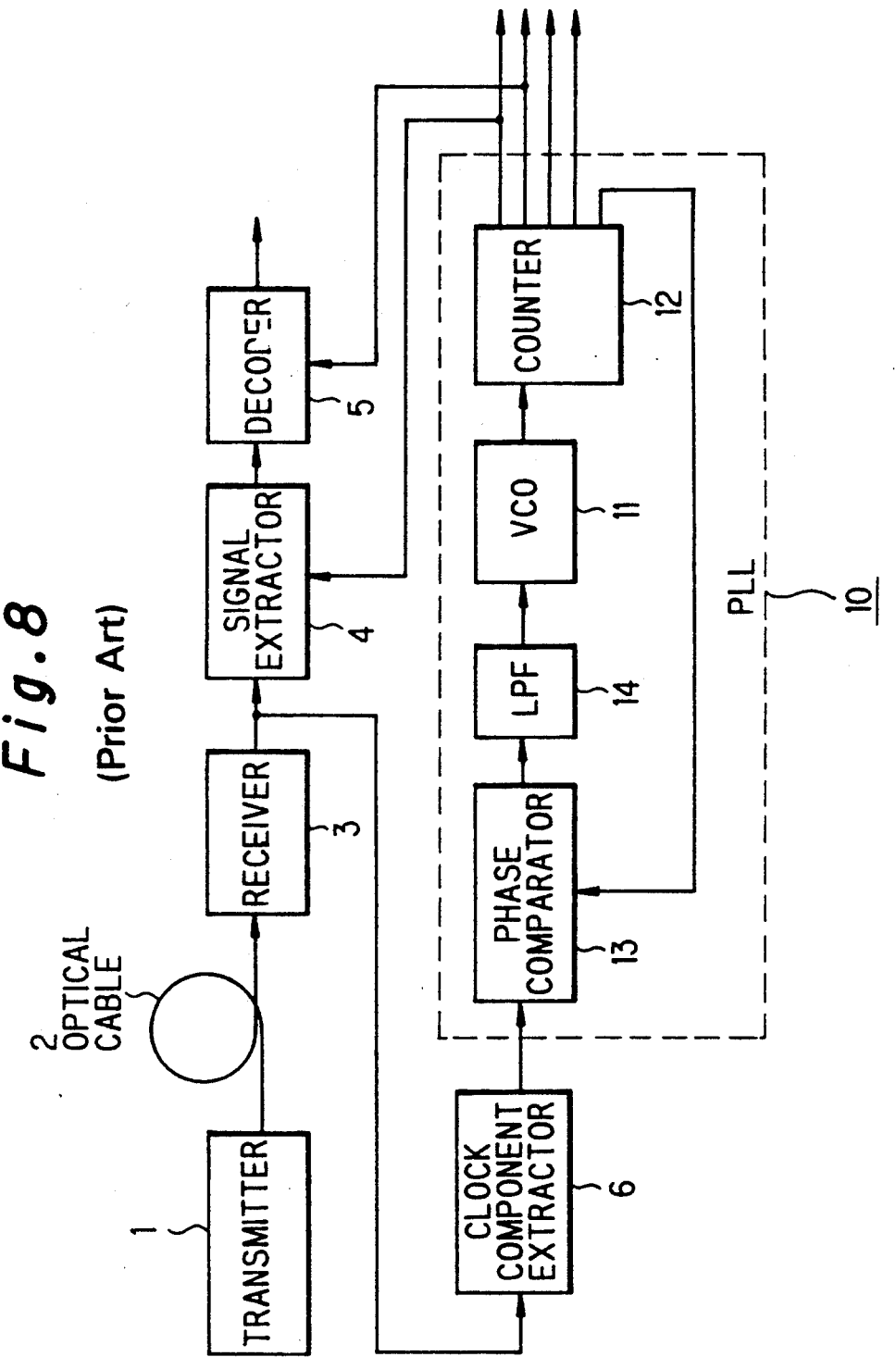
FIG. 8 shows a block diagram of a conventional data receiver.
Figure 9:
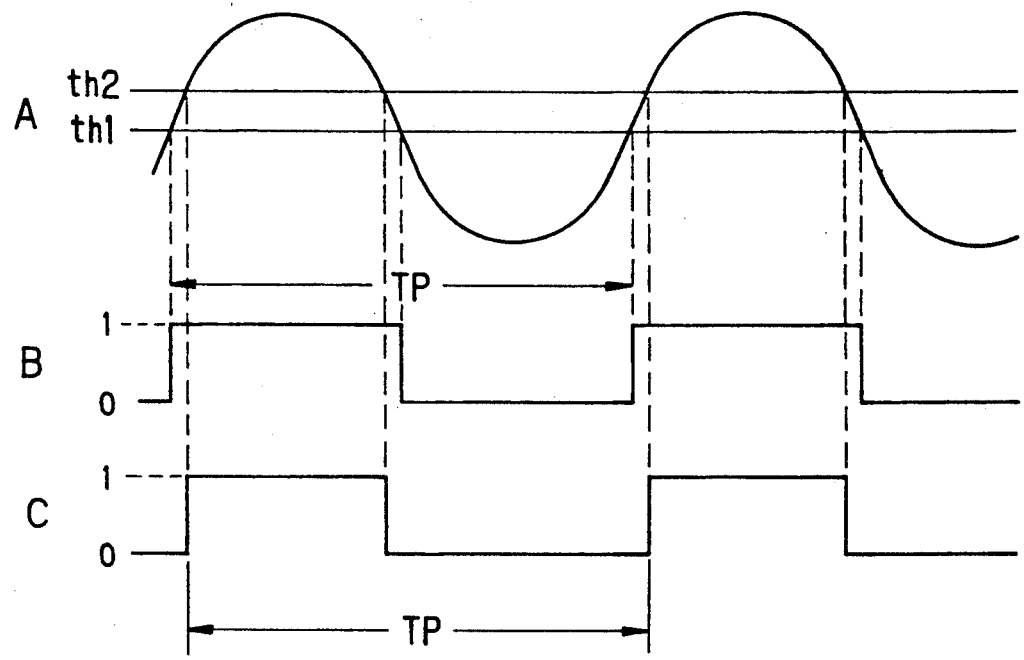
FIG. 9 illustrates how waveform distortion can occur.

In this operation, as shown in FIG. 4C, the output IBCR of switching circuit 253 becomes a signal without a waveform distortion but with a 1T delay from the input data IB (see, FIG. 4B). In this embodiment, a gate signal GT (see, FIG. 4D) is formed from this output IBCR so as to enable a secure detection of the synchronizing pattern. This operation will be described more in detail hereinafter.

The input data IB derived from the terminal 21 is supplied to a synchronizing pattern detector 41 and the output IBCR from the switching circuit 253 is supplied to a gate signal generator 42. This gate signal generator 42 raises the gate signal GT for synchronizing up to "1" for 1T period, for example, from a time 1.5T after a leading edge (or a trailing edge) of the output IBCR. The synchronizing pattern detector 41 detects the input data I as a synchronizing pattern whenever a trailing edge of the input data appears in a period during which the gate signal GT keeps in its "1" state (or a leading edge of the input data appears if the gate signal GT becomes "1" for 1T period from a time 1.5T after a trailing edge of the output IBCR).

The detected output SD of a synchronizing pattern (see, FIG. 4E) is supplied to the PLL 43 as a reference signal for synchronization. The PLL 43 provides the decoder 26 with clock which has a synchronized phase with this output SD. The data IBCR without a waveform distortion can be decoded, at the decoder 26, by clock from the PLL 43. Therefore, precise decoding can be expected.

It has been confirmed experimentally that the time interval of a signal "1" or "0" can be corrected even when the interval becomes shorter than one half of the regular one. It has also been confirmed that the data can be read out even when receiving data transmitted at twice as its normal speed.

Further, in the above embodiment, since all of the waveform corrector 20, the synthesizer 25 and the waveform distortion detector 30 can be made of digital circuits, they can be integrated into a single integrated circuit (e.g. large scale integration LSI).

While specific embodiments of the invention have been shown and disclosed, it is to be understood that numerous changes and modifications may be made by those skilled in the art without departing from the scope and intent of the invention. For example, though the embodiment was described as applied to digital audio data, it can be applied to any other digital data transmission for correcting waveform distortion. It is also easily understood that the modulated coding is not limited to Bi-Phase-Mark codings.

What is claimed is:

1. An apparatus for correcting wave distortion, comprising:

delay means to which an input signal is supplied;
   said input signal being so modulated that an accumulated value of a time interval from its leading edge to its trailing edge equal to another accumulated value of another time interval from a trailing edge to a leading edge, and
   said delay means generating plural delayed outputs, each of which has a certain time delay shorter than said time interval;
   selecting means for performing a selecting operation in which a plurality of delayed signals among said plural delayed outputs are selected;
   synthesizing means for performing a synthesizing operation in which said plurality of delayed signals are synthesized so that a synthesized signal can be obtained by correcting at least one of said time interval and said another time interval through said certain time delay;
   detecting means for detecting a difference between a time interval from a leading edge to a trailing edge and another time interval from a trailing edge to a leading edge of said synthesized signal out of said synthesizing means;
   means for generating a control signal which controls, based on a detected output by said detecting means, said selecting operation of selecting means and said synthesizing operation of a synthesizing means so as to accumulate a value of a time interval from a leading edge to a trailing edge of said synthesized signal equal to another accumulated value of another time interval from a trailing edge to a leading edge of said synthesized signal.

2. An apparatus for correcting wave distortion according to claim 1 wherein said input signal includes a synchronizing pattern which is unique and different from data, further comprising:
a detector for detecting said synchronizing pattern out of said input signal,
said detector receiving a gate signal generated out of said synthesized signal;
a phase locked loop circuit for receiving an detected output from said detector and generating clock signal for decoding a synthesized output.

3. An apparatus for correcting wave distortion according to claim 1 wherein said synthesizing means includes a first logic element and a second logic element, each having an output, connected to receive said plurality of delayed signals from said selecting means and switching means for selecting one of said outputs as said synthesized signal.

4. An apparatus for correcting wave distortion according to claim 5 wherein said first and second logic elements include an AND gate and an OR gate respectively.

5. An apparatus for correction of time distortion in a digital signal, comprising in combination:
delay means for receiving said digital signal and producing a first plurality of delayed signals;
selecting means for selecting a second plurality of delayed signals from said first plurality of delayed signals depending on the amount of delay distortion present;
determining means for determining if said time distortion produces a duty cycle of said digital signal is too long or too short;
first logic means for combining said second plurality of delayed signals to produce a first signal;
second logic means for combining said second plurality of delayed signals to produce a second signal; and
switching means for selecting one of said first and second signals as a corrected output depending upon the determination of said determining means.

6. The apparatus of claim 5, wherein said first logic means includes an AND gate and wherein said second logic means includes an OR gate.

7. The apparatus of claim 5, wherein said digital signal includes a synchronizing pattern which is unique and different from data, further comprising:
a detector for detecting said synchronizing pattern in said digital signal;
a phase locked loop circuit for receiving an detected output from said detector and generating clock signal.

8. The apparatus of claim 5, wherein said digital signal is so modulated that an accumulated value of a time interval from its leading edge to its trailing edge equals to another accumulated value of another time interval from a trailing edge to a leading edge, so that it has a duty cycle of approximately 50%.

* * * * *